United States Patent
Lee et al.

(10) Patent No.: US 8,112,447 B2
(45) Date of Patent: Feb. 7, 2012

(54) SYSTEM AND METHOD FOR PARSING A TEXT FILE

(75) Inventors: Chung-I Lee, Taipei Hsien (TW); Chien-Fa Yeh, Taipei Hsien (TW); Chiu-Hua Lu, Taipei Hsien (TW); Xiao-Di Fan, Shenzhen (CN); Xiao-Ping Zhang, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 520 days.

(21) Appl. No.: 12/351,857

(22) Filed: Jan. 12, 2009

(65) Prior Publication Data
US 2009/0182754 A1 Jul. 16, 2009

(30) Foreign Application Priority Data
Jan. 16, 2008 (CN) .......................... 2008 1 0300125

(51) Int. Cl.
*G06F 7/00* (2006.01)
*G06F 17/30* (2006.01)

(52) U.S. Cl. ..................................................... 707/797
(58) Field of Classification Search .................. None
See application file for complete search history.

(56) References Cited

U.S. PATENT DOCUMENTS

| | | | |
|---|---|---|---|
| 5,890,175 A * | 3/1999 | Wong et al. ............. | 715/236 |
| 2002/0026462 A1 * | 2/2002 | Shotton et al. .......... | 707/523 |

OTHER PUBLICATIONS

Michael M. Granaas "Simple, applied text parsing", Behavior Research Methods, Instruments & Computers 1985, pp. 209-216.*
An et al.,Periodical"The XML Parse and Application Based on Dom,"Journal of Chengde Petroleum College,Dec. 31, 2006,pp. 27-31,vol. 8 No. 24,China.
Qu et al., Periodical"The Realization of a Power Plant Inspector Processing System Based on XML,"Automation of Electric Power System,Dec. 25, 2004,pp. 88-90,vol. 28 No. 24,China.

* cited by examiner

*Primary Examiner* — Uyen T. Le
(74) *Attorney, Agent, or Firm* — Altis Law Group, Inc.

(57) ABSTRACT

A method for parsing a text file defines a tree pattern and a plurality of character string patterns. A tree structure corresponding to the text file is determined according to the tree pattern, and the desired data are retrieved from the text file according to the character string patterns. The retrieved desired data are output into a storage system.

13 Claims, 5 Drawing Sheets

*** purchase list from: HSS00001  
date: 20070601 17:32:03 supplierId: 9876543210        supplierName: *** corporation

| consigned | consignDate | productId | PoId | inAmount | price |
|---|---|---|---|---|---|
| HaA-012345 | 20070512 | 987654J00-001-BB | Ord-111111 | 2,400.00 | 12.45000 |
| HaA-123456 | 20070512 | 876543J00-001-BB | Ord-222222 | 2,400.00 | 12.45000 |
| HaA-234567 | 20070513 | 765432900-001-BB | Ord-333333 | 1,200.00 | 15.80000 |
| HaA-345678 | 20070515 | 654321J00-001-BB | Ord-444444 | 2,400.00 | 12.45000 |
| HaA-456789 | 20070515 | 543210900-001-BB | Ord-555555 | 8.00 | 15.80000 |
| HaA-567890 | 20070515 | 432109J00-001-BB | Ord-666666 | 2,400.00 | 12.45000 |
|  |  |  | Total: (RMB) | 21,616.00 | 138,606.40 |

*** purchase list from: HSS00002  
date: 20070601 17:32:03 supplierId: 9876543210        supplierName: *** corporation

| consigned | consignDate | productId | PoId | inAmount | price |
|---|---|---|---|---|---|
| HaA-987654 | 20070515 | 123456A00-002-AA | Ord-777777 | 1,200.00 | 15.90000 |
| HaA-876543 | 20070516 | 234567J00-002-AA | Ord-888888 | 2,400.00 | 12.45000 |
| HaA-765432 | 20070516 | 345678J00-002-AA | Ord-999999 | 2,400.00 | 12.45000 |
| HaA-654321 | 20070516 | 456789J00-002-AA | Ord-000000 | 1,200.00 | 12.45000 |
| HaA-543210 | 20070516 | 567890A00-002-AA | Ord-111110 | 1,200.00 | 15.90000 |
| HaA-432109 | 20070517 | 678901A00-002-AA | Ord-222220 | 1,200.00 | 15.90000 |
|  |  |  | Total: (RMB) | 19,200.00 | 131,940.00 |

FIG. 3

SYSTEM AND METHOD FOR PARSING A TEXT FILE

FIELD OF THE INVENTION

Embodiments of the present disclosure relate to text files, and particularly to a system and method for parsing a text file.

DESCRIPTION OF RELATED ART

Text files, such as text reports and text-based log files are usually used as a way to exchange data between applications and computer systems. However, the format and structure of text files vary in different applications. Therefore, it is difficult to process and integrate these data in different applications and computer systems.

BRIEF DESCRIPTION OF THE DRAWINGS

FIG. 3 illustrates one embodiment of a text file.

DETAILED DESCRIPTION OF CERTAIN INVENTIVE EMBODIMENTS

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
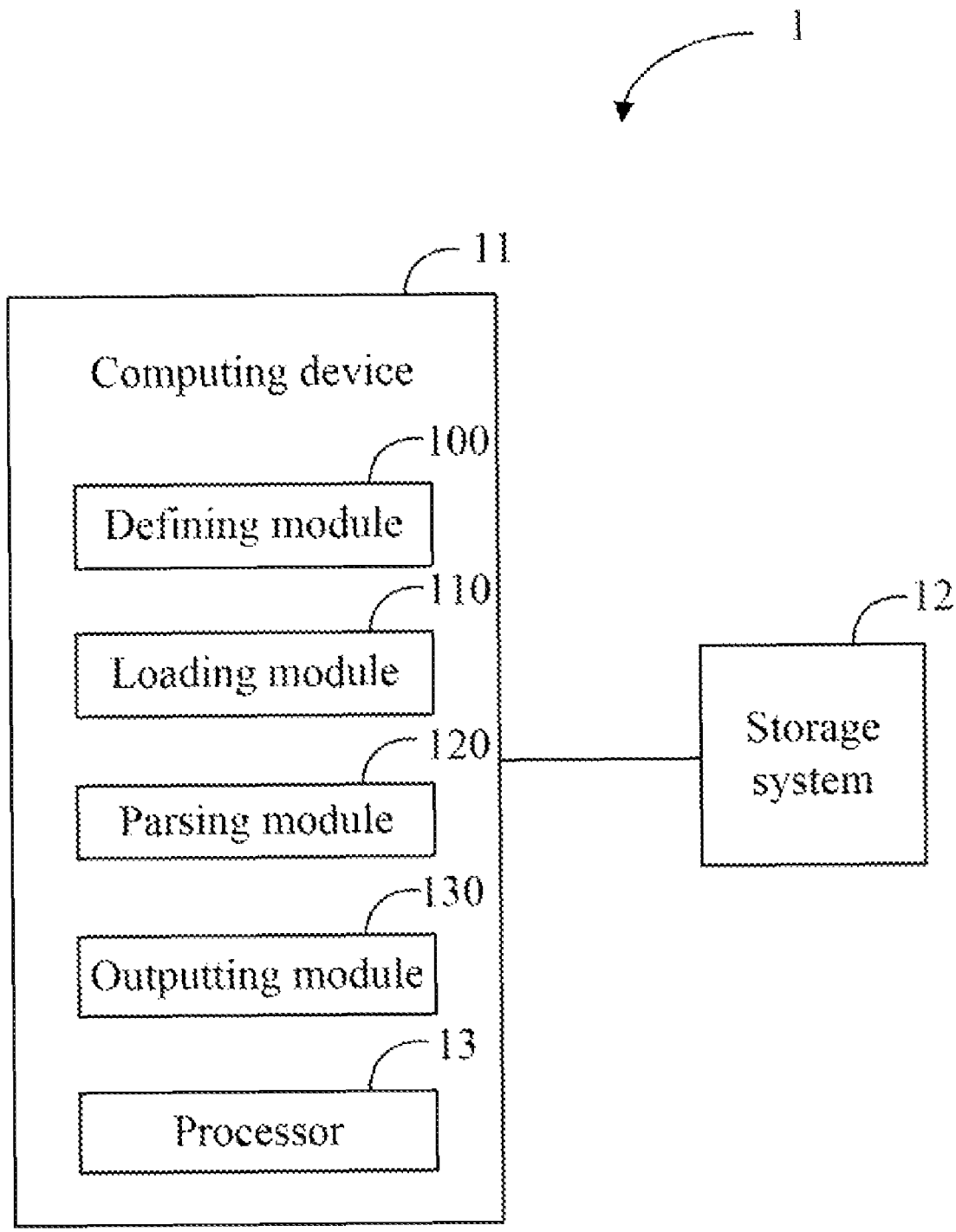
FIG. 1 is a block diagram of one embodiment of a system for parsing a text file.

FIG. 1 is a block diagram of one embodiment of a system 1 for parsing a text file 5 (shown in FIG. 3) to retrieve desired data from the text file 5. It may be understood that the text file 5 consists of various characters having one or more desired data according to some specified character strings in the text file 5. In one embodiment, the system 1 includes a computing device 11 and a storage system 12 connected to the computing device 11. The storage system 12 stores relevant data that are used, processed, and obtained while the text file 5 is parsed.

In one embodiment, the computing device 11 may include a defining module 100, a loading module 110, a parsing module 120, and an outputting module 130. The computing device 11 may comprise one or more processors, such as a processor 13 to execute one or more operations for the functional modules 100, 110, 120, and 130.

Figure 4:
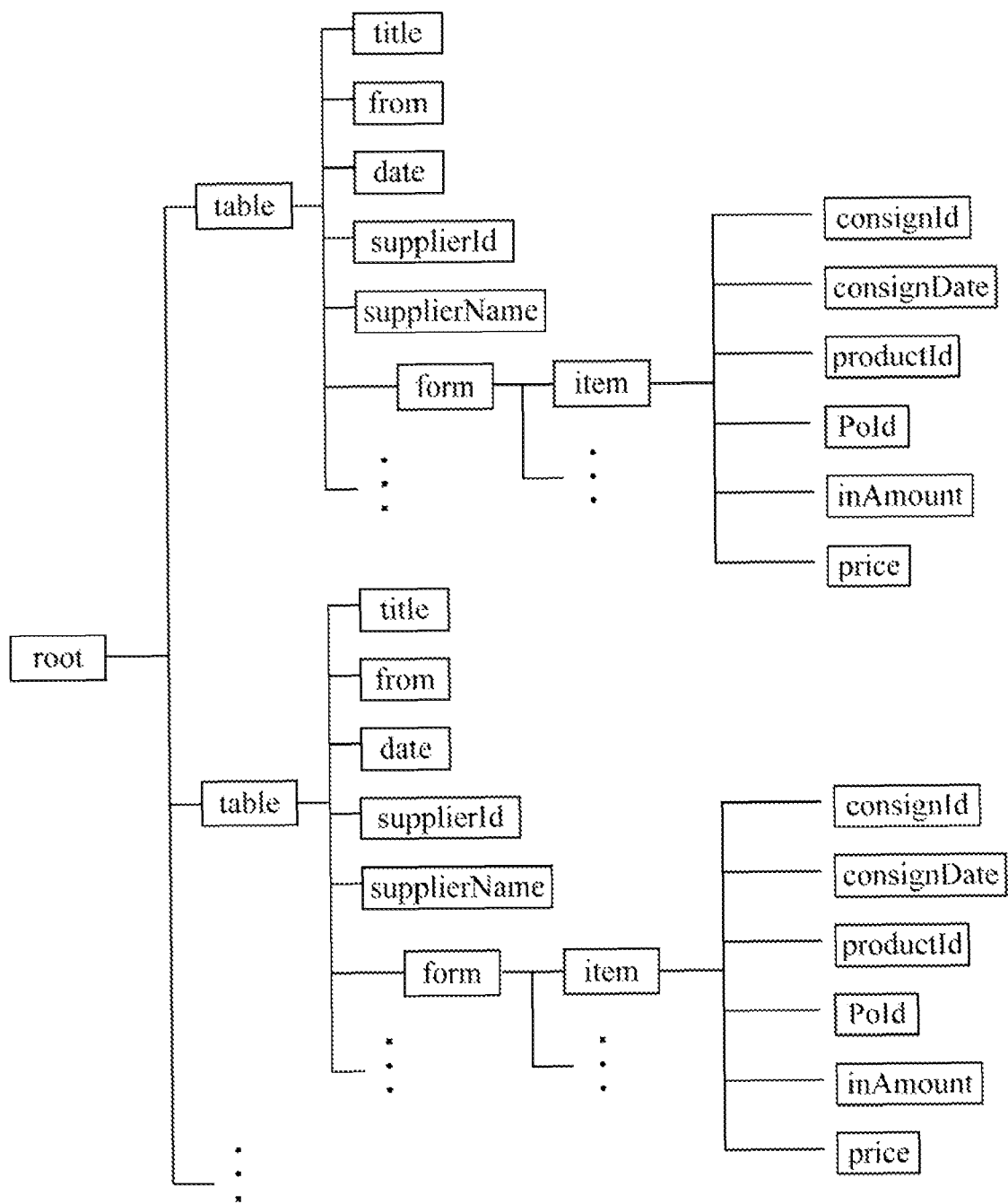
FIG. 4 illustrates an exemplary tree structure depicted by a tree pattern based on the text file in FIG. 3.

The defining module 100 is configured for defining a tree pattern to depict a tree structure based on the text file 5. The tree structure may consisting of a plurality of text blocks. Each of the text blocks represents a part of a text file with a same tree pattern as the text file 5. The defining module 100 defines where the text blocks begin, and where the text blocks end. The text blocks may include a root text block at the top of the tree structure, and one or more leaf text blocks positioned below the root text block. Each of the text blocks may contain one or more text blocks according to the tree structure. The leaf text blocks do not contain any text blocks, but contain desired data. With reference to FIG. 4, a text block named "root" contains at least one text block named "table." Each of the text blocks "table" contains a text block named "title," a text block named "from," a text block named "date," a text block named "supplierId," a text block named "supplierName," and at least one text block named "form." The text blocks "title," "from," "date," "supplierId," "supplierName," and "form" are leaf text blocks.

The defining module 100 is further configured for defining a plurality of character string patterns for identifying the desired data in the text file 5. It may be understood that a character string in the text file 5 is a desired data if the character string matches one of the character string patterns.

The loading module 110 is configured for loading the text file 5 into the storage system 12. In one embodiment, the loading module 110 loads the text file 5 into a data structure, such as an array.

The parsing module 120 is configured for determining a tree structure corresponding to the text file 5 according to the tree pattern. The parsing module 120 is further configured for retrieving the desired data from the text file 5 according to the character string patterns and the tree structure corresponding to the text file 5. In the illustrative embodiment, the text file 5 is loaded in an array. Accordingly, the text blocks of the text file 5 are located in the array.

The outputting module 130 is configured for outputting the retrieved desired data into the storage system 12. In one embodiment, the outputting module 130 outputs the retrieved desired data in a predetermined data format, such as the extensible markup language (XML).

Figure 2:
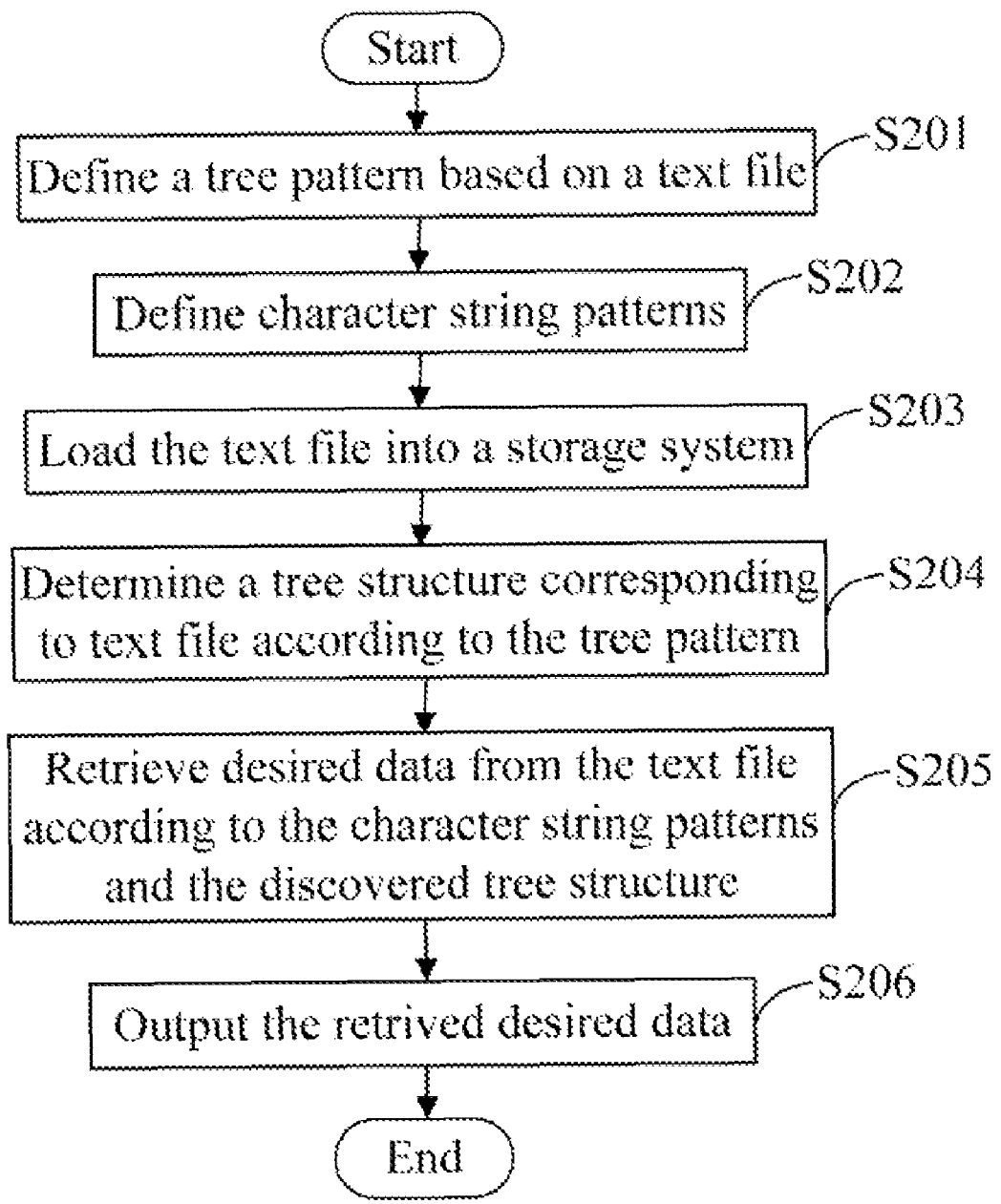
FIG. 2 is a flowchart of one embodiment of a method for parsing a text file.

FIG. 2 is a flowchart of one embodiment of a method for parsing the text file 5 to retrieve desired data from the text file 5 by implementing the system of FIG. 1. Depending on the embodiments, additional blocks may be added, others removed, and the ordering of the blocks may be changed.

In block 201, the defining module 100 defines a tree pattern to depict a tree structure based on the text file 5. As mentioned above, the tree structure consists of a plurality of text blocks. In one embodiment, the defining module 100 defines the tree pattern using XML.

In order to clearly illustrate the embodiment of the disclosure, FIG. 4 shows an example of a tree structure based on the text file 5 (shown in FIG. 3). A root text block named "root" contains at least one text block named "table." Each text block "table" contains a text block named "title," a text block named "from," a text block named "date," a text block named "supplierId," a text block named "supplierName," and at least one text block named "form." Each text block "form" contains at least one text block named "item." Moreover, each text block "item" contains a text block named "consigned," a text block named "consignDate," a text block named "productId," a text block named "PoId," a text block named "inAmount," and a text block named "price." The text blocks "title," "from," "date," "supplierId," "supplierName," "form," "consigned," "consignDate," "productId," "PoId," "inAmount," and "price" are leaf text blocks.

In block 202, the defining module 100 defines a plurality of character string patterns for identifying the desired data in the text file 5. In one embodiment, the defining module 100 describes the character string patterns using regular expressions. A regular expression is an expression that describes a set of character strings. For example, a set containing the three character strings "Hide," "Hine," and "Hinge" can be described by the regular expression Hi(d|ng?)e. In the regular expression, the vertical bar "|" is used to separate alternatives. The question mark "?" is used to indicate there is zero or one of the preceding elements (here is "g").

In block 203, the loading module 110 loads the text file 5 into the storage system 12. In one embodiment, the storage system 12 may be at least one of a hard disk drive, a compact disc, a digital video disc, and a tape drive system. As mentioned above, the loading module 110 may load the text file 5 into an array. For example, the text file 5 shown in FIG. 3 is loaded into an array named "S," with each line of the text file 5 as an element of the array "S." That is, a first line of the text file 5 is put into S[1], a second line of the text file 5 is put into S[2], and a fiftieth line of the text file 5 is put into S[49].

In block 204, the parsing module 120 locates one or more text blocks of the text file 5 according to the tree pattern to determine a tree structure corresponding to the text file 5. In one embodiment, the parsing module 120 firstly locates a root text block of the text file 5 according to the tree structure depicted by the tree pattern. The parsing module 120 then locates text blocks contained in the root text block of the text file 5. The leaf text blocks of the text file 5 are located recursively. As such, the tree structure corresponding to the text file 5 is discovered.

In block 205, the parsing module 120 retrieves the desired data from the text file 5 according to the character string patterns and the text blocks of the text file 5. In one embodiment, the parsing module 120 retrieves the desired data from the text file 5 by searching character strings that match the character string patterns from the leaf text blocks of the text file 5.

Figure 5:
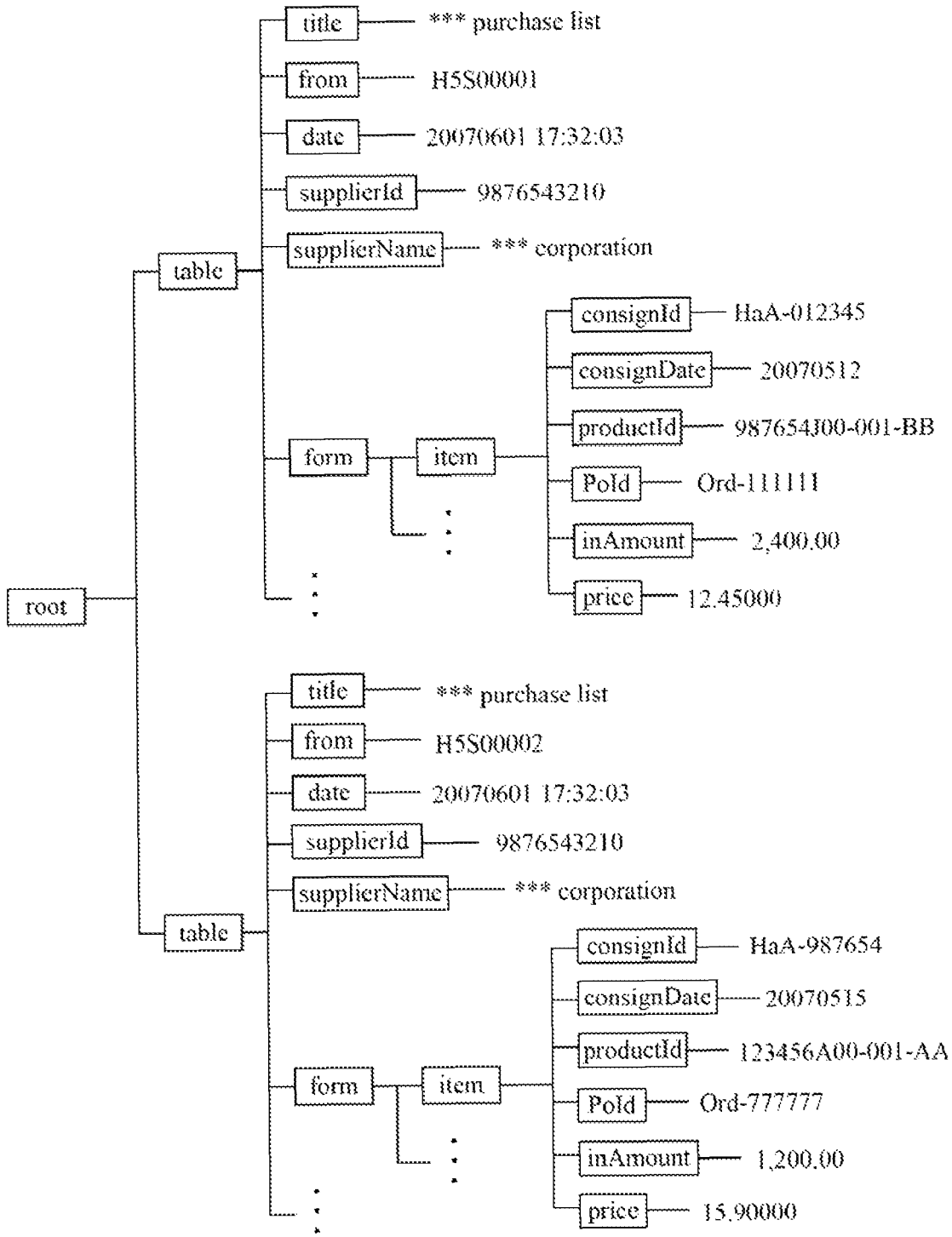
FIG. 5 illustrates one embodiment of a tree structure corresponding to the text file in FIG. 3.

FIG. 5 illustrates one embodiment of a tree structure corresponding to the text file 5 shown in FIG. 3. In the illustrative example, a root text block "root" of the text file 5 is located in S[1]-S[49]. The root text block "root" contains two text blocks "table" denoted table[0] and table[1]. The text blocks table[0] and table[1] are respectively located in S[1]-S[24] and S[26]-S[49]. Text blocks "title," "from," "date," "supplierId," "supplierName," and "form" contained in the text blocks table[0] are respectively located in S[1], S[2], S[3], S[5], S[5], and S[9]-S[24]. Accordingly, "* purchase list" is retrieved from the text block "title." "H5S00001" is retrieved from the text block "from." "20070601 17:32:03" is retrieved from the text block "date." "9876543210" is retrieved from the text block "supplierId." "* corporation" is retrieved from the text block "supplierName."

The text block "form" contained in the text blocks table[0] contains six text blocks "item" denoted item[0], item[1], item[2], item[3], item[4], and item[5]. The six text blocks "item" are respectively located in S[10], S[12], S[14], S[16], S[18], and S[20]. Each of the text blocks "item" contains a text block "consigned," "consignDate," "productId," "PoId," "inAmount," and "price." For the text block item[0], for example, "HaA-012345" is retrieved from the text block "consigned," "20070512" is retrieved from the text block "consignDate," "987654J00-001-BB" is retrieved from the text block "productId," "Ord-111111" is retrieved from the text block "PoId," "2,400.00" is retrieved from the text block "inAmount," and "12.45000" is retrieved from the text block "price."

In block 206, the outputting module 130 outputs the retrieved desired data into the storage system 12. In one embodiment, the retrieved desired data are output in a predetermined data format, such as XML. Depending on the embodiment, the retrieved desired data may be output in other data format, such as excel.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device for parsing a text file to retrieve desired data from the text file, the computing device comprising a storage device and further comprising:
    a defining module operable to define a tree pattern based on the text file, and define a plurality of character string patterns to identify the desired data;
    a loading module operable to load the text file into an array, wherein each line of the text file is an element of the array;
    a parsing module operable to locate one or more text blocks of the text file to determine a tree structure corresponding to the text file according to the tree pattern, and retrieve the desired data from the text file according to the tree structure corresponding to the text file and the character string patterns;
    an outputting module operable to output the retrieved desired data into the storage system; and
    at least one processor that executes the defining module, the loading module, the parsing module, and the outputting module.

2. The computing device of claim 1, wherein the tree pattern is defined by using extensible markup language (XML), and the character string patterns are defined by using regular expressions.

3. The computing device of claim 1, wherein the parsing module parses the text file in the array.

4. The computing device of claim 1, wherein the outputting module outputs the retrieved desired data in a predetermined data format.

5. The computing device of claim 4, wherein the predetermined data format is an XML format.

6. A computer-implemented method being executed by a processor of a computing device for parsing a text file, the method comprising:
    defining a tree pattern based on the text file, and defining a plurality of character string patterns to identify the desired data;
    loading the text file into an array, wherein each line of the text file is an element of the array;
    locating one or more text blocks of the text file to determine a tree structure corresponding to the text file according to the tree pattern, and retrieving the desired data from the text file according to the tree structure corresponding to the text file and the character string patterns; and
    outputting the retrieved desired data into a storage system.

7. The method of claim 6, wherein the tree pattern is defined by using extensible markup language (XML), and the character string patterns are defined by using regular expressions.

8. The method of claim 6, wherein the retrieved desired data are output in a predetermined data format.

9. The method of claim 8, wherein the predetermined data format is an XML format.

10. A non-transitory computer-readable medium having stored thereon instructions that, when executed by a computerized device, cause the computerized device to execute a computer-implemented method comprising:
    defining a tree pattern based on the text file, and defining a plurality of character string patterns to identify the desired data;
    loading the text file into an array, wherein each line of the text file is an element of the array;
    locating one or more text blocks of the text file to determine a tree structure corresponding to the text file according to the tree pattern, and retrieving the desired data from the text file according to the tree structure corresponding to the text file and the character string patterns; and outputting the retrieved desired data into a storage system.

11. The non-transitory computer-readable medium of claim 10, wherein the tree pattern is defined by using extensible markup language (XML), and the character string patterns are defined by using regular expressions.

12. The non-transitory computer-readable medium of claim 10, wherein the retrieved desired data are output in a predetermined data format.

13. The non-transitory computer-readable medium of claim 12, wherein the predetermined data format is an XML format.

* * * * *

UNITED STATES PATENT AND TRADEMARK OFFICE
CERTIFICATE OF CORRECTION

PATENT NO. : 8,112,447 B2  
APPLICATION NO. : 12/351857  
DATED : February 7, 2012  
INVENTOR(S) : Lee et al.

Page 1 of 1

It is certified that error appears in the above-identified patent and that said Letters Patent is hereby corrected as shown below:

Title page item (73) replace "Assignees" on the front page of the Patent with the following:

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW).

Signed and Sealed this  
Twenty-ninth Day of May, 2012

David J. Kappos  
*Director of the United States Patent and Trademark Office*